United States Patent [19]

Bertiger et al.

[11] Patent Number: 5,161,248
[45] Date of Patent: Nov. 3, 1992

[54] METHOD OF PREDICTING CELL-TO-CELL HAND-OFFS FOR A SATELLITE CELLULAR COMMUNICATIONS SYSTEM

[75] Inventors: Bary R. Bertiger, Scottsdale, Ariz.; Raymond J. Leopold, Colorado Springs, Colo.; Kenneth M. Peterson, Phoenix, Ariz.

[73] Assignee: Motorola, Inc., Schaumburg, Ill.

[21] Appl. No.: 415,815

[22] Filed: Oct. 2, 1989

[51] Int. Cl.⁵ .......................................... H04B 7/185
[52] U.S. Cl. ................................... 455/17; 455/12.1; 455/33.2; 379/60; 342/352
[58] Field of Search ................... 455/12, 17, 7, 33, 34, 455/54; 342/352, 353, 357; 379/60

[56] References Cited

U.S. PATENT DOCUMENTS

| | | | |
|---|---|---|---|
| 3,340,531 | 9/1967 | Kefalas et al. | 342/353 |
| 3,824,548 | 7/1974 | Sullivan et al. | 455/12 |
| 4,718,081 | 1/1988 | Brenig | 379/60 |
| 4,829,519 | 5/1989 | Scotton et al. | 455/33 |
| 4,868,886 | 9/1989 | Assac et al. | 455/12 |
| 4,872,015 | 10/1989 | Rosen | 455/13 |
| 4,972,456 | 11/1990 | Kaczmarek et al. | 455/33 |
| 5,654,879 | 3/1990 | Goldman et al. | 455/33 |

Primary Examiner—Curtis Kuntz
Assistant Examiner—Edward Urban
Attorney, Agent, or Firm—Frank J. Bogacz

[57] ABSTRACT

A method of predicting cell-to-cell hand-offs of mobile subscribers for a satellite cellular communications system. Each satellite of a constellation projects a number of beams or cells upon the earth for communication with mobile subscribers. The satellite transfers (hand-offs) communications links from cell to cell as the satellite moves over the mobile subscriber. Since the movement of the satellite is stabilized in three directions, the projection of the beams or cells follows a predictable path across the face of the earth. Each satellite moves across the earth in one direction. Once a subscriber is located within one cell, the next cell to which the mobile subscriber is handed-off may be determined from the geographic position. For mobile users which are close to boundaries between cells, additional position location may be determined by the calculation of bit error rates. The results of these bit error rate measurements then indicate the identity of the cell which is to receive the hand-off of the mobile user.

20 Claims, 3 Drawing Sheets

METHOD OF PREDICTING CELL-TO-CELL HAND-OFFS FOR A SATELLITE CELLULAR COMMUNICATIONS SYSTEM

CROSS REFERENCE TO RELATED APPLICATIONS

The present application is related to copending U.S. patent application Ser. No(s). 263,849; 07/402,743; 07/415,814; 07/415,842 and 07/414,494 all being assigned to the same assignee as the present invention.

Background of the Invention

The present invention pertains to cell-to-cell hand-off in cellular systems and more particularly to a method for predicting the cell-to-cell hand-offs in a satellite cellular system.

Terrestrial cellular telephone systems perform cell-to-cell hand-offs of calls of mobile subscribers during communication. These terrestrial cellular telephone systems project a number of contiguous cells over a geographic area of the earth. An antenna, located at approximately the center of the cell, performs the transmission and reception of signals from the mobile subscribers. The size of each cell in terrestrial cellular systems is such that a mobile subscriber in an automobile or other vehicle may travel from one through a number of other cells in a relatively short period of time. As a mobile subscriber moves from one cell to another cell, a hand-off procedure is employed. The switching network indicates to the mobile subscriber to change frequencies from a channel which was used in the first cell to a new frequency of a new channel to used in the second cell.

Because there are a number of contiguous cells to which a mobile subscriber may travel, a method for determining into which cell the subscriber is to be handed-off is required. If the subscriber is handed-off into an incorrect cell with a new frequency, the mobile subscriber's call will become lost and he will be disconnected from his conversation. Such hand-off decision making is typically accomplished by measuring the amplitude of the signal received from the mobile subscriber. One such terrestrial cellular telephone system is shown in S. Goldman U.S. Pat. No. 4,654,879, issued on Mar. 31, 1987.

In satellite systems, the cells projected on the earth are much larger than those of the terrestrial systems. In addition, the satellite moves quite rapidly and as a result, subscribers must be transferred from one cell to the next much more often than terrestrial systems.

Accordingly, it is an object of the present invention to provide a method for optimizing cell-to-cell hand-offs in a satellite cellular communication system.

SUMMARY OF THE INVENTION

In accomplishing the object of the present invention, a novel method of predicting cell-to-cell hand-offs for a satellite cellular communication system is shown.

A method for predicting cell-to-cell hand-offs of mobile subscribers for a satellite communication system includes a satellite which has a processor for executing the method of predicting cell-to-cell hand-offs. The first step of the method for predicting cell-to-cell hand-offs is to determine the position of the mobile subscriber as being within a particular cell of the satellite.

Next, the method includes selecting a second cell within the satellite. This second cell is one located in the direction of movement of the satellite as being the next cell to be positioned over the mobile subscriber. Lastly, at the appropriate time the processor of the satellite executes the hand-off of the mobile subscriber's communication link from the first cell to the second cell.

The above and other objects, features, and advantages of the present invention will be better understood from the following detailed description taken in conjunction with the accompanying drawings.

DESCRIPTION OF THE PREFERRED EMBODIMENT

The disclosures and teachings of U.S. Patent application Ser. No(s). 263,849; 07/402,743; 07/415,814; 07/415,842 and 07/414,494 are hereby incorporated by reference.

Figure 1:
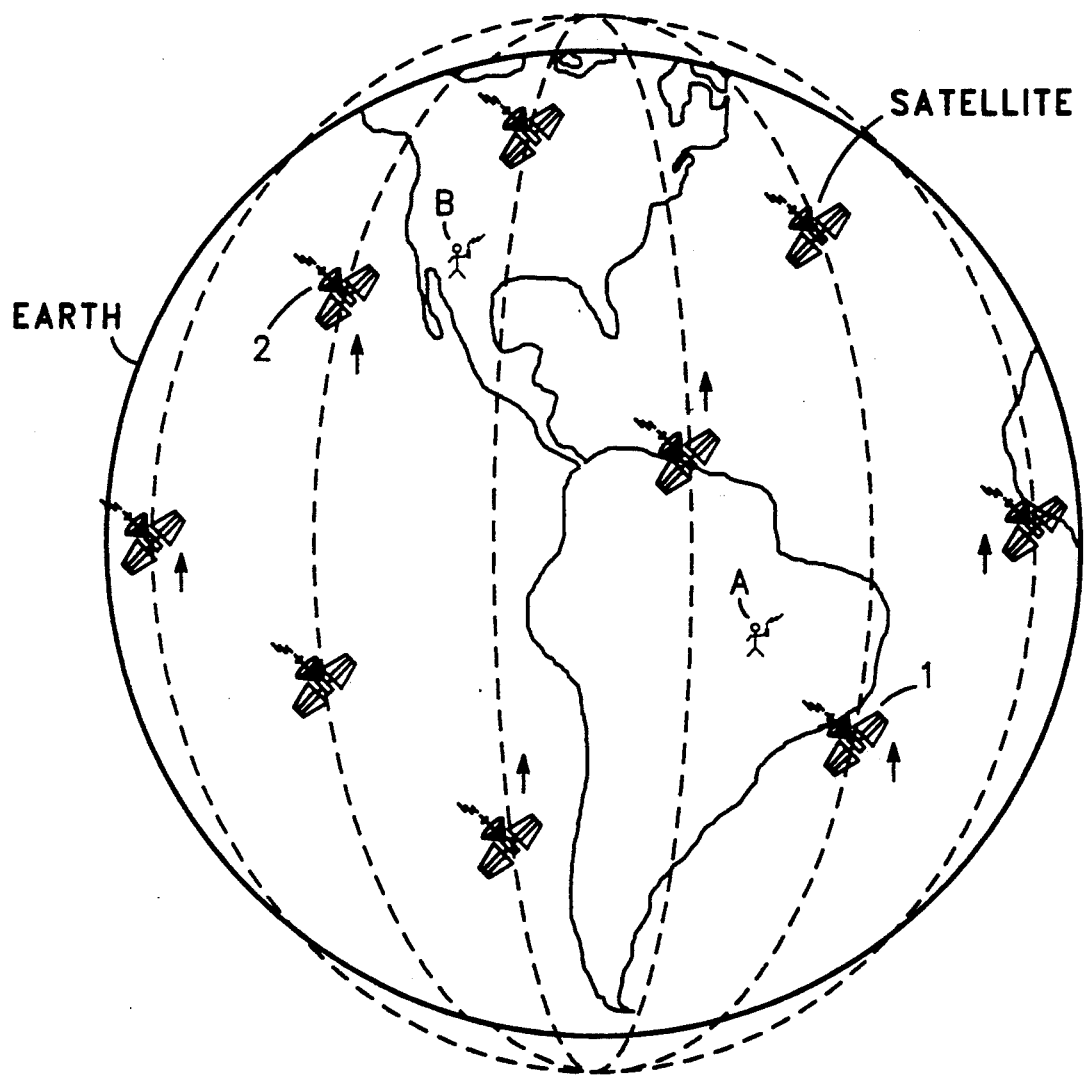
FIG. 1 depicts a satellite constellation moving across the earth.

FIG. 1 depicts a number of satellites orbiting the earth in low-earth orbit. In a preferred embodiment of the invention, there are 77 of such satellites orbiting the earth in this constellation. There may be seven substantially polar planes of orbiting satellites. Each plane of satellites includes eleven satellites.

FIG. 1 shows a number of these orbiting satellites. Each of these orbiting satellites is moving in an upward, from the north pole toward the south pole, direction as they cross the western hemisphere of the earth. This movement in a known direction causes the cells of a satellite to move over a particular place on earth or mobile subscriber in a predictable defined fashion. Satellites such as those shown in FIG. 1 travel at a speed of approximately 17,000 miles per hour. As a result of this speed, the satellites move quite rapidly over an earthbound subscriber. Since the satellite projects a number of beams or cells on the earth, a number of these cells move over the mobile user during a normal satellite to subscriber communication.

Figure 2:
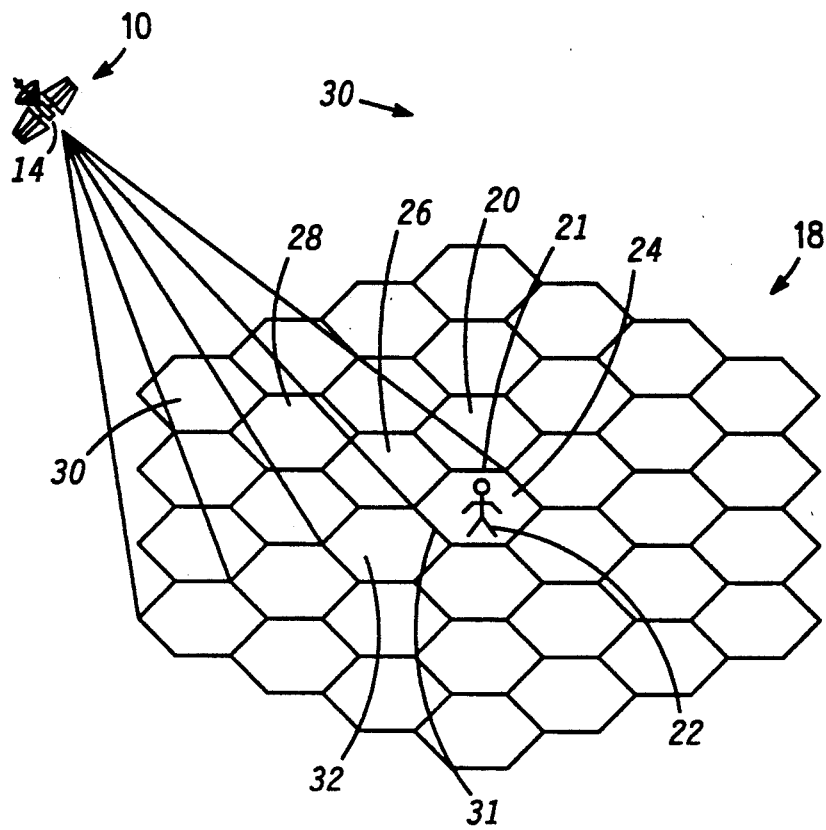
FIG. 2 is a detailed depiction of a satellite projecting a 37-beam cellular pattern onto the earth.

The cell pattern projected by a satellite of FIG. 1 is shown in FIG. 2. This cell pattern may be arranged to be approximately 250 nautical miles in diameter. It takes approximately 130 seconds for each cell to move over a relatively fixed mobile subscriber on the earth. In approximately 700 to 800 seconds, the complete cell pattern as shown in FIG. 2 moves over a particular mobile user.

Referring again to FIG. 1, it can be seen that the movement of a mobile subscriber on the earth, even one in a rapidly travelling jet plane, is such as to be negligible when compared with the velocity vector of 17,000 miles per hour of the satellite. As a result, the movement or velocity vector of a user within one cell will have little affect on the overall movement or velocity vector of the satellite. The movement of the mobile user will be negligible with respect to the movement of the satellite. As a result, the cell pattern of the satellite will move over the mobile user in a predictable manner. For example, in FIG. 1, mobile subscribers A and B shown in South and North America, respectively, will have the cell patterns move over them in a south-to-north direction at one particular time. In the eastern hemisphere of the earth, the satellites will move in a known direction also. This direction will be from north-to-south. However, as the earth rotates, these directions will change, but the direction of movement of the cells over the earth is always predictable.

Again, referring to FIG. 2, satellite 10 is shown projecting a cell pattern 18 onto the earth. The cell pattern 18 is formed by the satellite's antenna system 14. Satellite 10 also includes a processor system (not shown) for executing the prediction method. One such antenna system is shown and described in U.S. patent application Ser. No. CR-1931 entitled "Multiple Beam Deployable Space Antenna System" which is assigned to the same assignee as the subject application and which has the same inventive entity as the subject application. This patent application was previously incorporated by reference.

The movement of satellite 10 will be assumed to be in direction 30 for purposes of explanation. Mobile subscribers within pattern 18 have their requests for communication handled through satellite 10. Each cell, such as cell 20, for example, of cell pattern 18 can be seen to be a conical cell. Since satellite 10 is in orbit about the earth, each of the cells of pattern 18 is continuously moving. This is in contrast to terrestrial cellular telephone systems in which the cells are fixed and the mobile users move through the cells. Terrestrial cellular systems hand-off a call based upon detection of the amplitude of the mobile subscriber transmission signals.

Since satellite 10 has a known movement direction 30, a mobile subscriber 22 which is presently located in cell beam 24 will be handed-off by cell 24 to cell 26. Cell 26 will then hand-off mobile subscriber's 22 call to cell 28. Lastly, subscriber 22 will have his call handed-off from cell 28 to cell 30, as satellite 10 passes completely over the location of subscriber 22.

As can be seen, once the location of subscriber 22 is known and since the movement 30 of satellite 10 is known the prediction of which cell to transfer the call of subscriber 22 is readily determined. Again, it is to be emphasized that the movement of subscriber 22 is negligible with respect to the movement of satellite 10. However, if subscriber 22 were located close to a boundary of cell 24, the movement of satellite 10 may cause his communication transmission to be handled adjacent cells 20 or 32. In such cases, satellite 10 must decide whether subscriber 22 is closer to the boundary 21 between cells 20 and 24 or to the boundary 31 between cells 32 and 24. In order to perform this decision, satellite 10 requests transmissions from mobile subscriber 22 periodically to determine a bit error rate (BER). After determining this bit error rate a number of times, the satellite's processor may determine whether subscriber 22 is closer to boundary 21 or 31. To determine a bit error rate, satellite 10 interrogates mobile cellular phone of subscriber 22. Mobile subscriber 22 has his phone respond with messages which contain a known preamble or bit stream of N bits. Since each mobile subscriber's channel is approximately 6 kilobytes per second channel, the satellite may cause this known preamble to transmitted a number of times to develop enough transmitted information for calculating a bit error rate. Thereby, the satellite may predict for the case in which subscriber 22 is close to a boundary, such 21 or 31, which cell, such as 20 or 32 respectively, to hand-off the call of subscriber 22.

Figure 4:
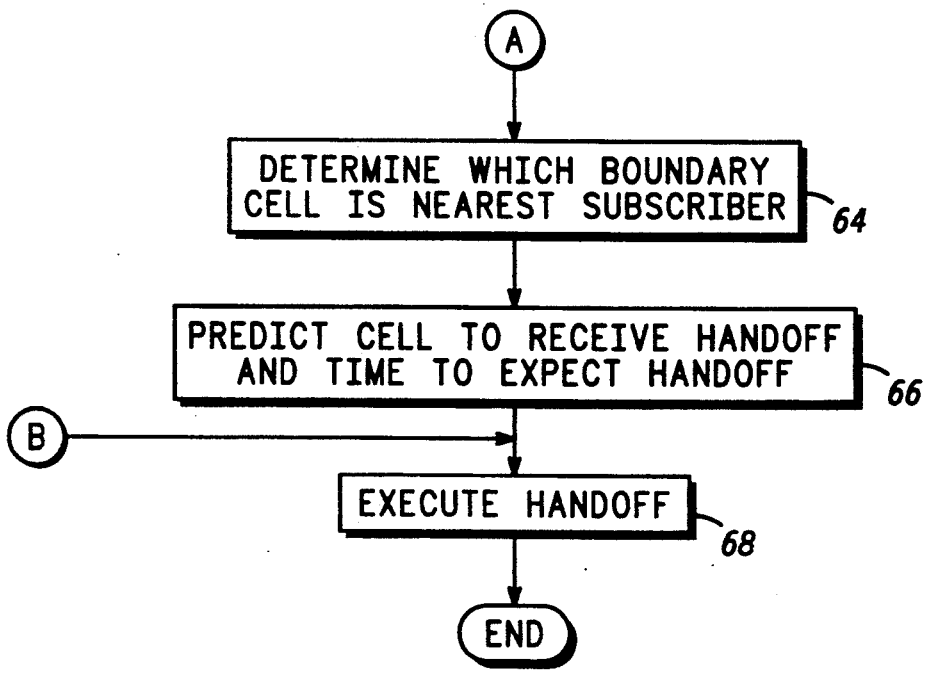
FIGS. 3 and 4 is a flow chart of the method of predicting the satellite's cell-to-cell hand-off.
Figure 3:
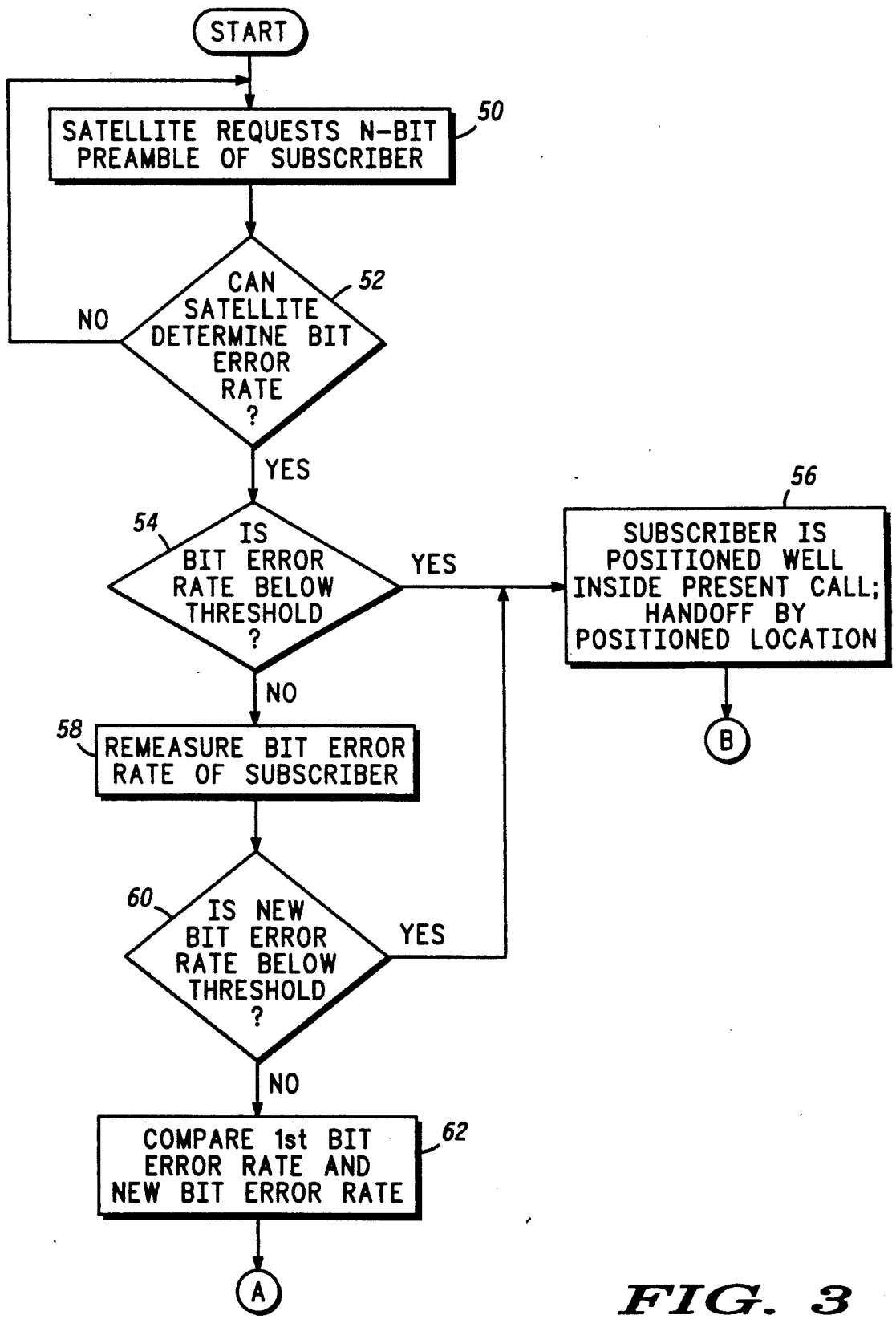

Referring to FIGS. 3 and 4, a method of predicting the cell-to-cell hand-off as shown. The method is started and block 50 is entered. First, the satellite requests an N-bit preamble from the subscriber's mobile station, block 50. Once the satellite has established communication with the mobile subscriber, the satellite requests via a command channel that the mobile station send a preamble of N bits to the satellite. This preamble may be a 16, 32, etc. or longer bit stream which is predetermined by the satellite and the mobile station. For example, the preamble may be a 32-bit stream of alternating ones and zeros.

When the satellite receives the preamble, the satellite determines whether it has enough bits transmitted to determine a bit error rate, block 52. The transmission channel between the satellite 10 and mobile subscriber 22, as shown in FIG. 2, it typically a 6 kilobyte per second channel. Therefore, the preamble may be sent a number of times in order for satellite 10 to have a sufficient number of bits in order to determine a bit error rate. Usually thousands of bits are required to perform this bit error rate determination. If the satellite has not collected enough bits for determination of the bit error rate, the N path is followed from block 52 to block 50 where the satellite again requests the N-bit preamble transmission. If enough bits have been collected to determine a bit error rate, the Y path is followed from block 52 to block 54.

Block 54 determines whether the bit error rate is below a certain threshold. The bit error rate threshold may be set at a approximately $10^{-5}$. The bit error rate of $10^{-5}$ indicates that the bit error rate is approximately zero and that the subscriber 22 is well within the boundaries of cell 24, for example. This threshold figure may be set to any one of a number of particular levels, since a very precise measurement is not required. However, bit error rates of $10^{-2}$ or $10^{-3}$ typically indicate a high bit error rate. If the bit error rate is below the threshold, block 54 transfers control via the Y path to block 56. Block 56 determines that the subscriber is well within the boundaries of the present cell. Further, block 56 determines that the cell hand-off may be accomplished by simple positions location since the motion of satellite 10 in direction 30 is known. Block 56 then transfers control to block 68 which performs the cell-to-cell transfer.

Next, block 54 transfers control to block 58. The bit error rate being above the threshold indicates that mobile subscriber 22 is near a boundary such as boundary 21 or boundary 31. As a result, it is necessary to remeasure the bit error rate of the subscriber, block 58.

Then block 60 determines whether the new bit error rate is below the threshold value. If the new bit error rate is below the threshold, block 60 transfers control via the Y path to block 56 and subsequent processing proceeds as mentioned above. This indicates that the movement of the satellite 10 and subscriber 22 has been such that the subscriber is now positioned well inside the boundaries of cell 24. Therefore, block 56 can perform the determination of the next sequential cell to receive the call of mobile subscriber 22 by positional location, as mentioned above. For example, in this case, the call of subscriber 22 would be transferred from cell 24 to cell 26. Then block 56 transfers control to block 68 where the hand-off is executed and the process ended.

If the new bit error rate is above the threshold, block 60 transfers control to block 62 via the N path. This indicates that the subscriber is still located near a boundary of cell 24, for example. Block 62 compares the first bit error rate and the new bit error rate. From this comparison, block 64 determines which boundary cell is nearest subscriber 22. That is, block 64 determines whether subscriber 22 is near boundary 21 between cells 24 and 20 or boundary 31 between cells 32 and 24.

Lastly, a prediction is made as to which cell is to receive the hand-off and the particular time at which to execute the hand-off, block 66. Block 68 then performs the hand-off and the process is ended.

As can be seen from the above description, the cell-to-cell hand-off method is streamlined and optimized. For the majority of mobile subscribers, their calls will be handed-off from one cell to another by simple positional location. That is, the subscriber will be located well within the boundaries of a cell and therefore, the cell-to-cell hand-off may be accomplished in a straight forward manner since the direction of movement 30 of satellite 10 is known. In this example, the call of subscriber 22 would be handed-off from cell 24 to cell 26, then to cell 28 and finally to cell 30.

In cases where a subscriber is near a boundary, the bit error rate is used to detect the subscriber's location and therefore the next cell to receive the subscriber's call. As a result, satellite 10 is able to accurately predict which cell is next to receive the subscriber's call, since a combination of bit error rate and positional location is employed. This contrasted with the terrestrial systems' use of amplitude of the subscriber's signal to determine cell-to-cell hand-off. The method described herein provides a much smaller rate of lost calls than does conventional terrestrial systems.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method of predicting cell-to-cell hand-offs of a mobile subscriber for a satellite cellular communication system, said satellite projecting a plurality of cells, each cell for facilitating communication with said subscriber, and a processor for executing said method of predicting cell-to-cell hand-offs, said satellite being in orbit about the earth, said method of predicting cell-to-cell hand-offs of a mobile subscriber for a satellite cellular communication system comprising the steps of:
   determining the position of said mobile subscriber as being within a first cell of said satellite;
   selecting a second cell of said satellite, said second call being in a direction of movement of said satellite as the next cell to be positioned over said mobile subscriber; and
   executing said hand-off of said subscriber from said first cell to said second cell when said subscriber is in the proximity of a boundary of said second cell and said first cell.

2. A method of predicting cell-to-cell hand-offs as claimed in claim 1, wherein there is further including the steps of:
   second determining a bit error rate for transmissions by said mobile subscriber for a predetermined number of said cells;
   second selecting a second cell based upon the value of said bit error rates; and
   second executing said hand-off of said subscriber from said first cell to said second cell.

3. A method of predicting cell-to-cell hand-offs as claimed in claim 2, wherein said step of second selecting includes the step of finding a bit error rate which is a minimum value of said bit error rates.

4. A method of predicting cell-to-cell transfers as claimed in claim 3, wherein said step of second determining further includes the steps of:
   fourth determining whether a sufficient number of messages have been received to determine said bit error rate;
   iterating said steps of claim 5, if an insufficient number of messages have been received to determine said bit error rate.

5. A method of predicting cell-to-cell hand-offs as claimed in claim 2, wherein there is further included the step of selectably executing said steps of claim 2 in response to a determination that said mobile subscriber is located in the proximity of a boundary of said first cell.

6. A method of predicting cell-to-cell hand-offs as claimed in claim 5, wherein said step of second determining includes the steps of:
   requesting by said satellite that said mobile subscriber transmit a message of a predetermined length to said satellite;
   transmitting by said mobile subscriber said message of said predetermined length and content to said satellite;
   receiving said transmitted message by said satellite; and
   third determining whether any bit errors exist within said received message by said satellite.

7. A method of predicting cell-to-cell hand-offs as claimed in claim 6, wherein said step of second determining further includes the steps of:
   calculating said bit error rate of said messages; and
   determining whether said bit error rate is less than a predetermined threshold value.

8. A method of predicting cell-to-cell hand-offs as claimed in claim 7, wherein said step of second selecting includes the steps of:
   third selecting said second cell as being in the movement of said satellite, if said bit error rate is less than said threshold value; and
   executing said hand-off of said subscriber from said first cell to said second cell.

9. A method of predicting cell-to-cell hand-offs as claimed in claim 8, wherein said step of second determining further includes the step of fifth determining a second bit error rate of the mobile subscriber, in response to said first bit error rate being greater than said threshold level.

10. A method of predicting cell-to-cell hand-offs as claimed in claim 9, wherein said step of second determining further includes the steps of:
   sixth determining whether said second bit error rate is less than said predetermined threshold value; and
   second iterating said steps of claim 8 in response to a determination that said second bit error rate is less than said threshold value.

11. A method of predicting cell-to-cell hand-offs as claimed in claim 9, wherein said step of second selecting further includes the steps of:
   comparing said first and said second bit error rates; and
   seventh determining a location of said mobile subscriber.

12. A method of predicting cell-to-cell hand-offs as claimed in claim 11, wherein said step of second selecting further includes the step of eighth determining a boundary of said first cell which is closest to said location of said mobile subscriber.

13. A method of predicting cell-to-cell hand-offs as claimed in claim 12, wherein there is further included the steps of:
   first predicting a second cell based upon said determination of said boundary which is closest to said mobile subscriber's location; and
   second predicting a time at which to perform said hand-off from said first cell to said second cell.

14. A method of predicting cell-to-cell hand-offs as claimed in claim 13, wherein said step of executing includes the step of performing said hand-off from said first cell to said second cell at said predicted time in order to maintain continuous communication with said mobile subscriber by said satellite.

15. A method of predicting cell-to-cell hand-offs as claimed in claim 1, wherein there is further included the step of finding a direction of movement of said orbiting satellite with respect to said mobile subscriber.

16. A method of predicting cell-to-cell hand-offs of a mobile subscriber for a satellite cellular communication system, said satellite projecting a plurality of cells, each cell for facilitating communication with said subscriber, and a processor for executing said method of predicting cell-to-cell hand-offs, said satellite being in orbit about the earth, said method of predicting cell-to-cell hand-offs of a mobile subscriber for a satellite cellular communication system comprising the steps of:
   determining a bit error rate for transmissions by said mobile subscriber in a first cell of said satellite for a predetermined number of said cells;
   selecting a second cell based upon the value of said bit error rates for those cells in a direction of movement of said satellite; and
   executing said hand-off of said subscriber from said first cell to said second cell of said satellite.

17. A method of predicting cell-to-cell hand-offs as claimed in claim 16, wherein said step of selecting includes the step of finding a bit error rate corresponding to a cell which is a minimum value of said bit error rates.

18. A method of predicting cell-to-cell hand-offs of a mobile subscriber for a satellite cellular communication system, said satellite projecting a plurality of cells, each cell for facilitating communication with said subscriber, and processor for executing said method of predicting cell-to-cell hand-offs, said satellite being in orbit about the earth, said method of predicting cell-to-cell hand-offs of a mobile subscriber for a satellite cellular communications system comprising the steps of:
   determining a position of said mobile subscriber as being within a first cell of said satellite;
   second determining a bit error rate for transmissions by said mobile subscriber for a predetermined number of said cells;
   selecting a second cell of said satellite, said second cell being in a directional movement of said satellite as the next cell to be positioned over said mobile subscriber, if said bit error rate is less than or equal to a threshold value;
   alternately selecting a third cell based upon the value of a bit error rates, if said bit error rate is greater than said threshold value; and
   executing said hand-off from said first cell to said second cell or to said third cell;

19. A method of predicting cell-to-cell hand-offs as claimed in claim 18, wherein said step of alternately selecting includes the step of finding a bit error rate corresponding to a cell which is a minimum value of said bit error rates.

20. A method of predicting cell-to-cell hand-offs as claimed in claim 18, where there is further included the step of finding a direction of movement of said orbiting satellite with respect to said mobile subscriber.

* * * * *

UNITED STATES PATENT AND TRADEMARK OFFICE
CERTIFICATE OF CORRECTION

PATENT NO. : 5,161,248
DATED : November 3, 1992
INVENTOR(S) : Barry R. Bertiger, et. al.

It is certified that error appears in the above-indentified patent and that said Letters Patent is hereby corrected as shown below:

```
Column 5, line 50, claim, 1, change "call" to cell--
Column 6, line 19, claim 6, change "5" to --4--
         line 32, claim 7, change "6" to --5--
         line 40, claim 8, after "the" insert direction--.
```

Signed and Sealed this

Twenty-fourth Day of January, 1995

*Attest:*

BRUCE LEHMAN

*Attesting Officer*  *Commissioner of Patents and Trademarks*